(12) United States Patent
Andarawis et al.

(10) Patent No.: US 7,333,913 B2
(45) Date of Patent: Feb. 19, 2008

(54) CLEARANCE MEASUREMENT SYSTEM AND METHOD OF OPERATION

(75) Inventors: Emad Andarawis Andarawis, Ballston Lake, NY (US); Mahadevan Balasubramaniam, Clifton Park, NY (US); Todd Alan Anderson, Niskayuna, NY (US); Samhita Dasgupta, Niskayuna, NY (US); David Mulford Shaddock, Troy, NY (US); Shobhana Mani, Clifton Park, NY (US); Jie Jiang, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/167,434

(22) Filed: Jun. 27, 2005

(65) Prior Publication Data

US 2007/0005294 A1 Jan. 4, 2007

(51) Int. Cl.
*G01B 5/14* (2006.01)
(52) U.S. Cl. .................................................. 702/158
(58) Field of Classification Search ............. 415/174.1
See application file for complete search history.

(56) References Cited

U.S. PATENT DOCUMENTS

| | | | |
|---|---|---|---|
| 4,049,349 A * | 9/1977 | Wennerstrom | 356/4.07 |
| 4,818,948 A | 4/1989 | Dooley et al. | |
| 4,823,071 A * | 4/1989 | Ding et al. | 324/662 |
| 4,842,477 A * | 6/1989 | Stowell | 415/118 |
| 4,928,089 A * | 5/1990 | Gasiunas et al. | 340/870.31 |
| 4,987,555 A * | 1/1991 | Twerdochlib | 702/158 |
| 5,070,302 A | 12/1991 | Marcus et al. | 324/662 |
| 5,097,711 A * | 3/1992 | Rozelle et al. | 73/660 |
| 5,166,626 A * | 11/1992 | Hester et al. | 324/690 |
| 6,594,555 B2 * | 7/2003 | Steingraeber | 700/279 |
| 6,785,635 B2 * | 8/2004 | von Flotow | 702/184 |
| 6,848,193 B1 | 2/2005 | Kirzhner | |
| 2006/0132147 A1 * | 6/2006 | Balasubramaniam et al. | 324/662 |

FOREIGN PATENT DOCUMENTS

GB 2312958 11/1997

* cited by examiner

*Primary Examiner*—John Barlow
*Assistant Examiner*—Jonathan Moffat
(74) *Attorney, Agent, or Firm*—Fletcher Yoder

(57) ABSTRACT

A clearance measurement system is provided. The clearance measurement system includes a reference geometry disposed on a first object having an otherwise continuous surface geometry and a sensor disposed on a second object, wherein the sensor is configured to generate a first signal representative of a first sensed parameter from the first object and a second signal representative of a second sensed parameter from the reference geometry. The clearance measurement system also includes a processing unit configured to process the first and second signals to estimate a clearance between the first and second objects based upon a measurement difference between the first and second sensed parameters.

35 Claims, 13 Drawing Sheets

CLEARANCE MEASUREMENT SYSTEM AND METHOD OF OPERATION

BACKGROUND

The invention relates generally to clearance measurement systems, and more particularly to a clearance measurement system for measuring a clearance between a stationary component and a continuous rotary component of a rotating machine.

Various types of sensors have been used to measure the distance between two objects. In addition, these sensors have been used in various applications. For example, a steam turbine has a rotating bucket that is disposed adjacent a carrier. The clearance between the rotating bucket and the carrier varies due to various operating conditions, such as changes in temperature, oxidation of the bucket tip, and so forth. It is desirable that a gap or clearance between the rotating bucket and the carrier be maintained during operation of the steam turbine.

One existing sensor is a capacitance probe, which measures a capacitance for estimating the clearance between two components. Unfortunately, existing capacitance-based measurement techniques are limited in that they yield a direct current voltage based measurements for measuring clearances between stationary and rotating structures that are continuous in the direction of rotation. The measurements yield a static output in time, such as a direct current voltage level proportional to the clearance. As a result, the measurements do not account for changes in the clearance due to changes in temperature of the components, electronic drifts in the gain, offset of the electronics, oxidation of the bucket tip, and other factors.

Moreover, these clearance measurement systems are typically employed to measure clearances between components during design and offline testing. Unfortunately, these existing systems are ineffective for in-service measurements due to the noise and drift generated by changes in the geometry of the components, among other factors. Instead, in-service clearance control is based on the clearance measurements previously taken during design and offline testing of components. As the components become worn during service, the offline measurements become ineffective for in-service clearance control.

Accordingly, a need exists for providing a clearance measurement system that provides an accurate measurement of clearance between two components by minimizing the effect of calibration drift and noise in the system. It would also be advantageous to provide a self-calibrating clearance measurement system that could be employed for accurate clearance measurement for parts in operation.

BRIEF DESCRIPTION

In accordance with certain embodiments, the present technique has a clearance measurement system. The clearance measurement system includes a reference geometry disposed on a first object having an otherwise continuous surface geometry and a sensor disposed on a second object, wherein the sensor is configured to generate a first signal representative of a first sensed parameter from the first object and a second signal representative of a second sensed parameter from the reference geometry. The clearance measurement system also includes a processing unit configured to process the first and second signals to estimate a clearance between the first and second objects based upon a measurement difference between the first and second sensed parameters.

In accordance with certain embodiments, the present technique has a rotating machine. The rotating machine includes a rotating component spaced apart from a stationary component, wherein the rotating component comprises a continuous surface in the direction of rotation of the rotating component and a reference geometry disposed on the continuous surface of the rotating component. The rotating machine also includes a sensor configured to generate first and second signals representative of first and second sensed parameters corresponding to the rotating component and the reference geometry, respectively and a processing unit configured to process the first and second signals to estimate a clearance between the rotating and stationary components based upon a measurement difference between the first and second sensed parameters.

In accordance with certain embodiments, the present technique provides a method of measuring a clearance between a first object and a second object. The method includes generating a first signal indicative of a first sensed parameter corresponding to the first object via a sensor disposed on the second object and generating a second signal indicative of a second sensed parameter corresponding to a reference geometry disposed on a continuous surface geometry of the first object via the sensor disposed on the second object. The method also includes processing the first and second signals to estimate the clearance between the first and second objects based upon a measurement difference between the first and second sensed parameters.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
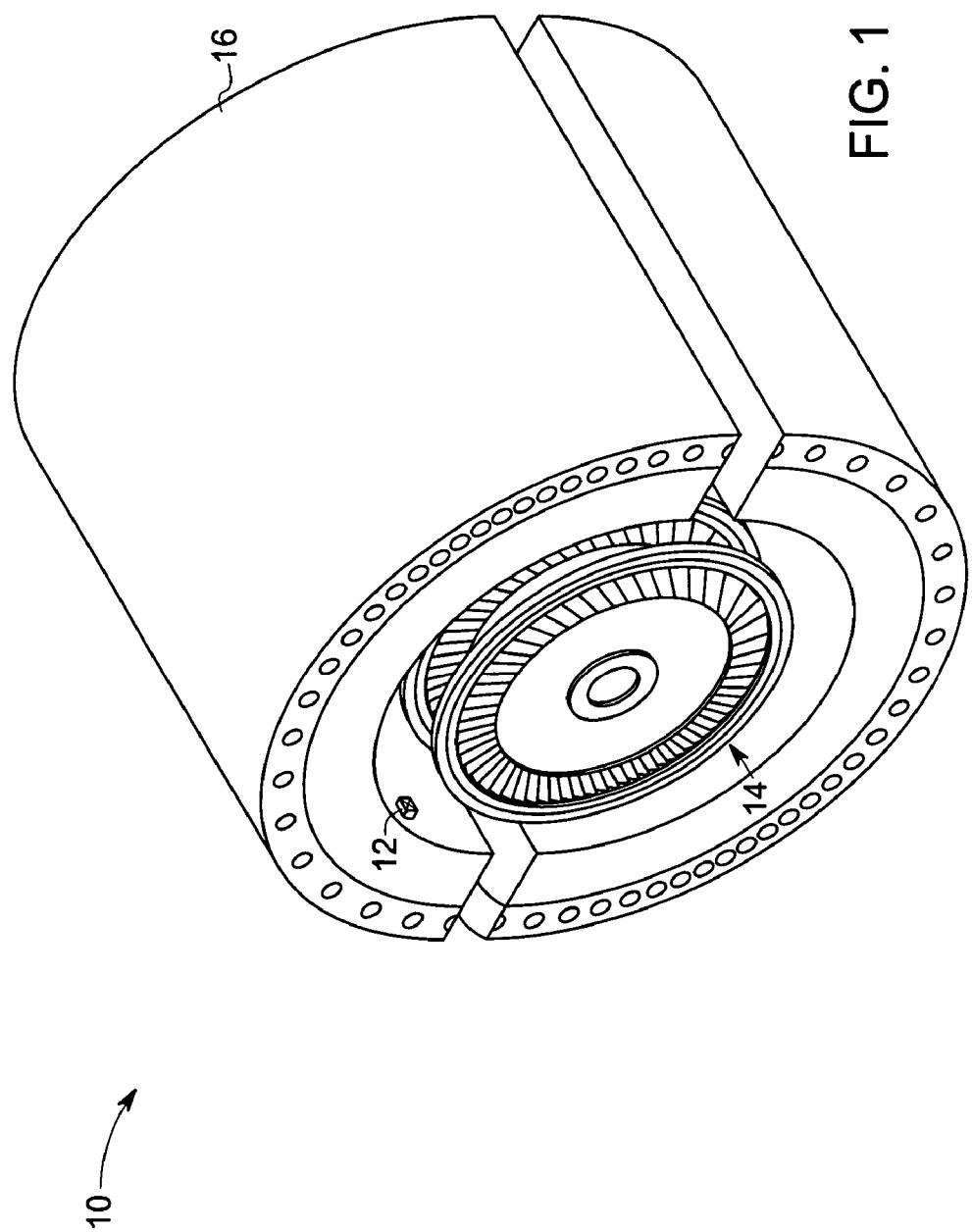
FIG. 1 is a diagrammatical perspective illustration of a steam turbine having a clearance measurement system in accordance with embodiments of the present technique.

As discussed in detail below, embodiments of the present technique function to provide an accurate measurement of clearance between two objects in various systems such as a steam turbine, a generator, a turbine engine (e.g., airplane turbine engine), a machine having rotating components and so forth. Referring now to the drawings, FIG. 1 illustrates a steam turbine 10 having a clearance measurement system 12 for measuring a clearance between two objects in the steam turbine 10. In the illustrated embodiment, the clearance measurement system 12 is configured for measuring the clearance between a rotating component 14 and a stationary component 16 in the steam turbine 10 that will be described in detail below.

Figure 2:
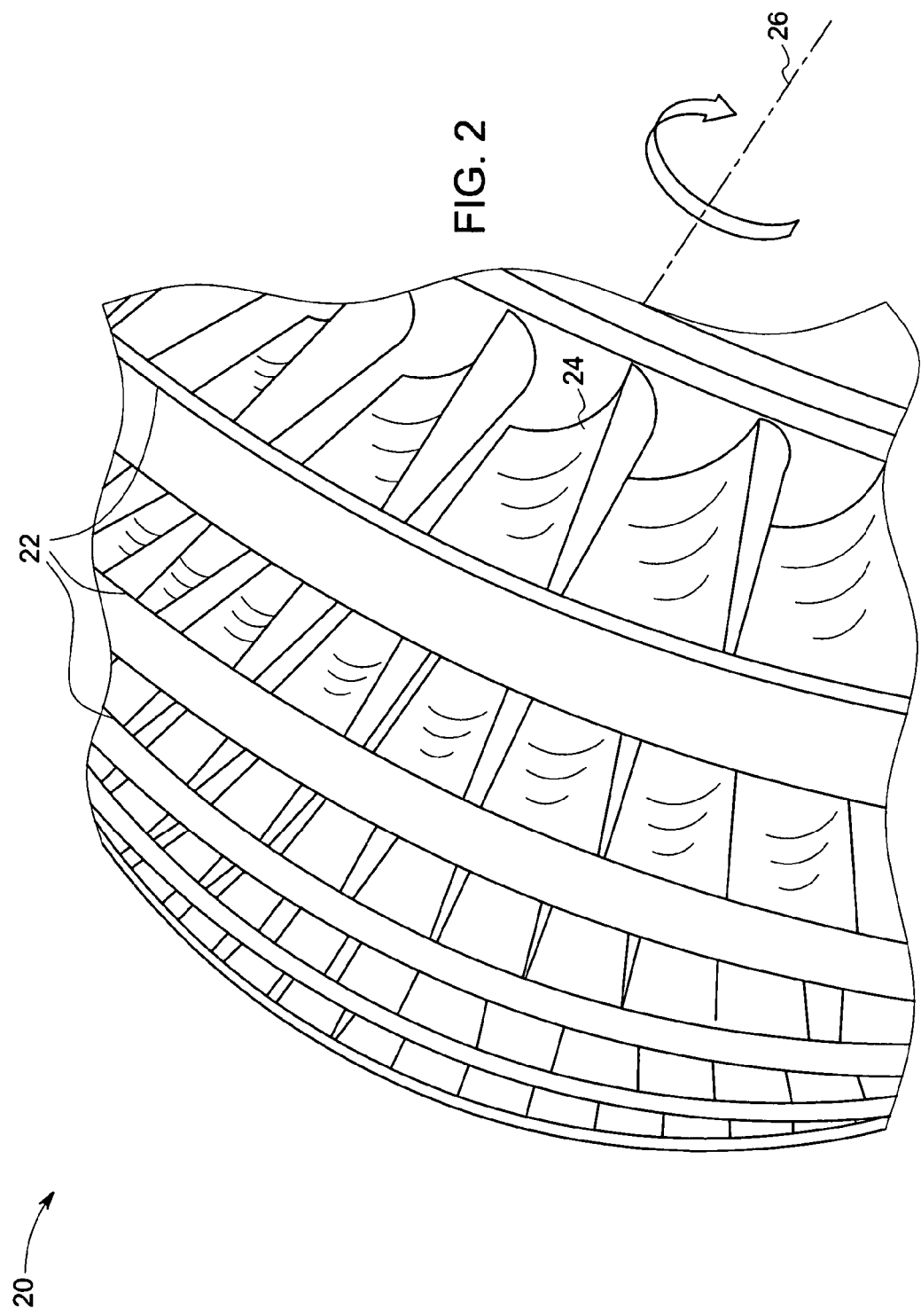
FIG. 2 is a partial diagrammatical perspective illustration of rotating buckets of the steam turbine of FIG. 1 in accordance with embodiments of the present technique.

FIG. 2 is a partial diagrammatical perspective illustration of a rotating component such as rotating buckets 20 of the steam turbine of FIG. 1 in accordance with embodiments of the present technique. In the illustrated embodiment, the rotating buckets 20 are arranged in a configuration having different stages 22 within the stationary component i.e., carrier 16. It should be noted that the carrier 16, which is disposed about the stages 22, is not being shown for the ease of illustration. The stages 22 within the carrier 16 include a plurality of rotating buckets 24 longitudinally spaced apart from one another along the length (and axis of rotation) of the steam turbine 10 of FIG. 1. In addition, the rotating buckets 24 are radially spaced apart from the carrier 16. In other words, the outer diameter of the rotating buckets 24 is smaller than the inner diameter of the carrier 16 as illustrated with reference to FIGS. 1 and 2. Therefore, a relatively small clearance exists between the outer circumference of the rotating buckets 24 and the inner surface of the carrier 16. Further, with the exception of the clearance control features discussed in detail below, the rotating buckets 24 form a continuously circular structure about an axis of rotation 26 of the rotating buckets 24. In this embodiment, the clearance measurement system 12 (see FIG. 1) is configured to measure the clearance between the stationary component (i.e., carrier) 16 and the rotating component (i.e., rotating buckets) 24 having the continuous surface geometry (i.e., a continuously circular geometry). In certain embodiments, the clearance measurement system 12 may be employed to measure the clearance between the stationary and rotating components in a generator as will be described below with reference to FIG. 3. However, measurement of clearance in other rotating machinery having a rotating component with continuous surface geometry is within the scope of this application.

Figure 3:
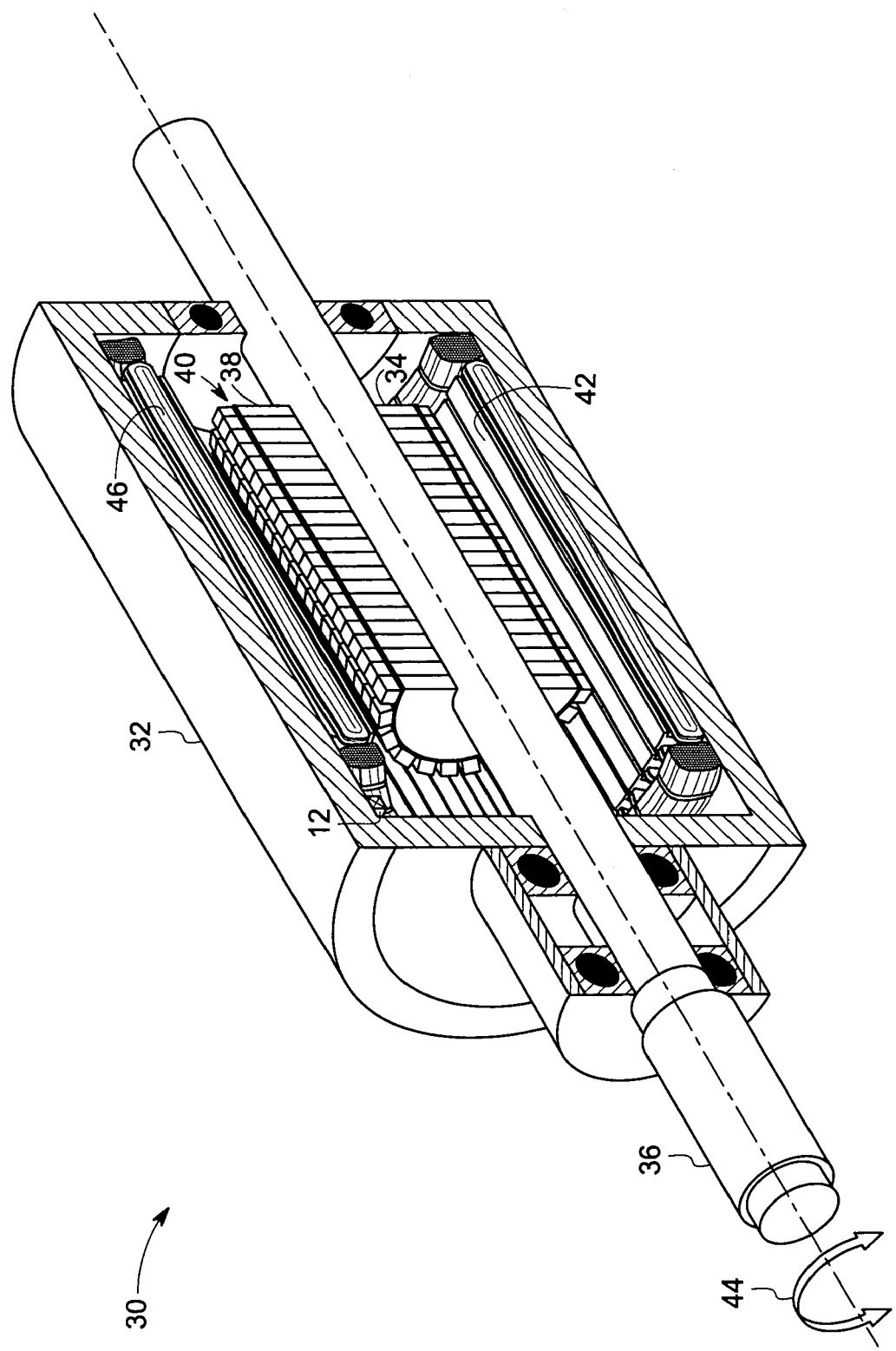
FIG. 3 is a diagrammatical perspective illustration of a generator having the clearance measurement system in accordance with embodiments of the present technique.

FIG. 3 is a diagrammatical perspective illustration of an electrical machine, such as a generator 30, having the clearance measurement system 12 in accordance with embodiments of the present technique. In the illustrated embodiment, the generator 30 includes a frame assembly 32 that surrounds and supports various components of the generator 30. The generator also includes a rotor assembly 34, which includes a rotor shaft 36 extending through a rotor core 38. Further, the rotor assembly 34 also includes magnetic assemblies 40 that are supported by the outer peripheral surface of the rotor core 38 and that generate a magnetic flux. The rotor assembly 34 along with the shaft 36 can rotate inside the stator assembly 42 in a clockwise or counter-clockwise direction as indicated by the directional arrow 44. Such rotation may be facilitated by bearing assemblies that surround the rotor shaft 36. As will be appreciated by those skilled in the art, various kinds of bearing assemblies may be utilized to support the rotor shaft 36.

In the illustrated embodiment, the rotor assembly 34 is located in a chamber of the stator assembly 42, which is in turn enclosed inside the frame 32. The stator assembly 42 includes a plurality of stator windings 46 that extend circumferentially around and axially along the rotor shaft 36 through the stator assembly 42. During operation, rotation of the rotor assembly 34 having the magnetic assemblies 40 causes a changing magnetic field to occur within the generator 30. This changing magnetic field induces voltage in the stator windings 46. Thus, the kinetic energy of the rotor assembly 34 is converted into electrical energy in the form of electric current and voltage in the stator windings 46. It should be noted that a clearance between the rotor and stator assemblies 34 and 42 is maintained within a pre-determined range. In a present embodiment, the clearance measurement system 12 is coupled to the stator assembly 42 for measuring the clearance between the rotor and stator assemblies 34 and 42. In this embodiment, the clearance measurement system 12 includes a capacitive probe and the clearance between the rotor and stator assemblies 34 and 42 is estimated based upon a capacitance sensed via the capacitive probe.

The clearance measurement system 12 employed for measuring the clearance between stationary and rotating components in the steam turbine and generator of FIGS. 1 and 2 is configured to convert direct current based capacitive measurements between the stationary and rotating components to time-varying capacitive measurements. The clearance measurement system 12 performs this conversion based on at least one reference geometry (e.g., a notch, groove, slot, etc.) interrupting the continuity of the continuous surface geometry (e.g., continuously circular geometry) of the rotating component about the axis of rotation 44. Such time-varying capacitive measurements are used for estimating the clearance between the rotor and stator assemblies 34 and 42 as will be described in a greater detail below.

Figure 4:
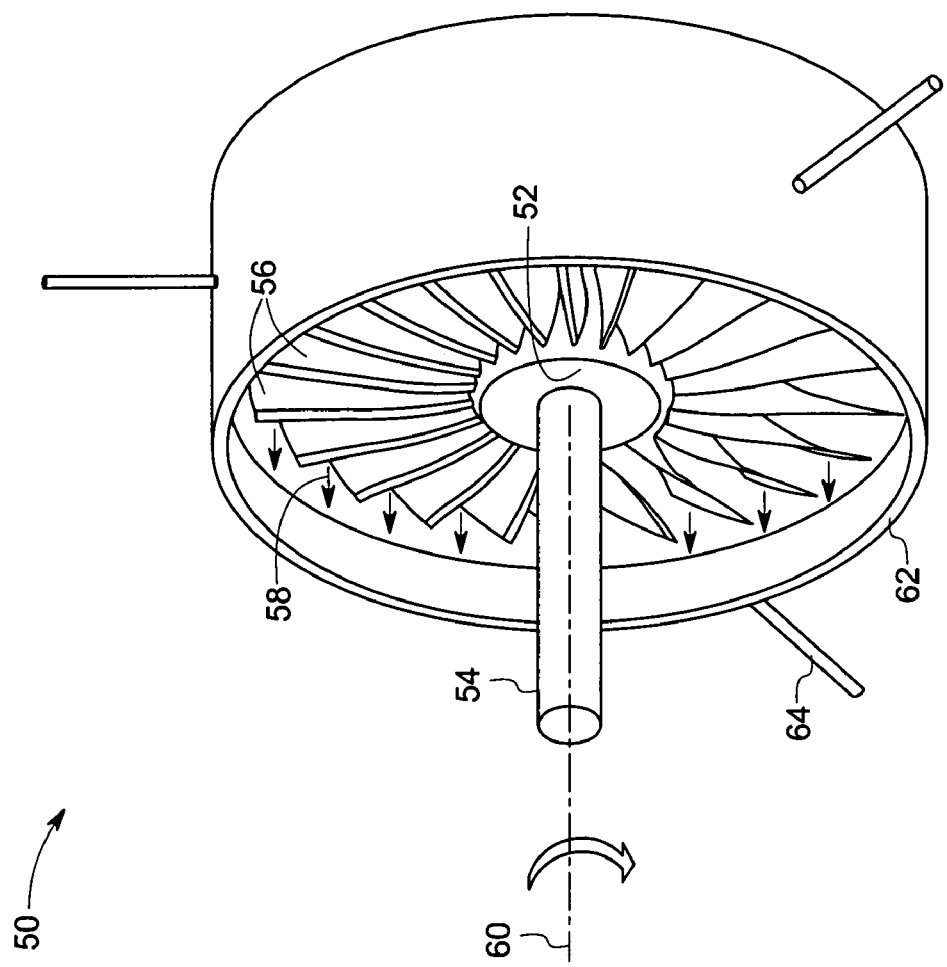
FIG. 4 illustrates a perspective view of the steam turbine of FIG. 1 having the clearance measurement system for measuring the clearance between the rotating buckets and the carrier in accordance with embodiments of the present technique.

FIG. 4 illustrates a rotating machine, such as a steam turbine 50 as illustrated in FIG. 1, wherein aspects of the present technique can be incorporated to measure clearance between rotating and stationary components. The steam turbine 50 includes a rotor 52 mounted on a shaft 54. A plurality of turbine blades 56, which may also be referred to as buckets, are affixed to the rotor 52. In operation, the blades 56 are subject to steam 58 at a high temperature and pressure, which causes the blades 56 to rotate about an axis 60. The blades 56 rotate within a stationary housing or shroud 62 that is positioned radially and circumferentially around the blades 16. A relatively small clearance exists between the blades 56 and the shroud 62 to facilitate rotation of the blades 56 within the shroud 62, while also preventing excessive leakage of the working fluid, i.e. steam, between the blades 56 and the shroud 62. In accordance with the present technique, one or more clearance sensors 64 are disposed within and circumferentially around the stationary shroud 62. In the illustrated embodiment, the clearance sensors 64 include capacitive probes. In certain embodiments, the clearance sensors 64 may include microwave-based sensors, or optical sensors, or eddy current sensors, and the sensed parameters may include impedance, or a phase delay, or an induced current, respectively. As explained in detail below, each of the sensors 64 is configured to generate a signal indicative of a radial and an axial position of the blades 56 with respect to the shroud 62 at their respective circumferential locations.

Figure 5:
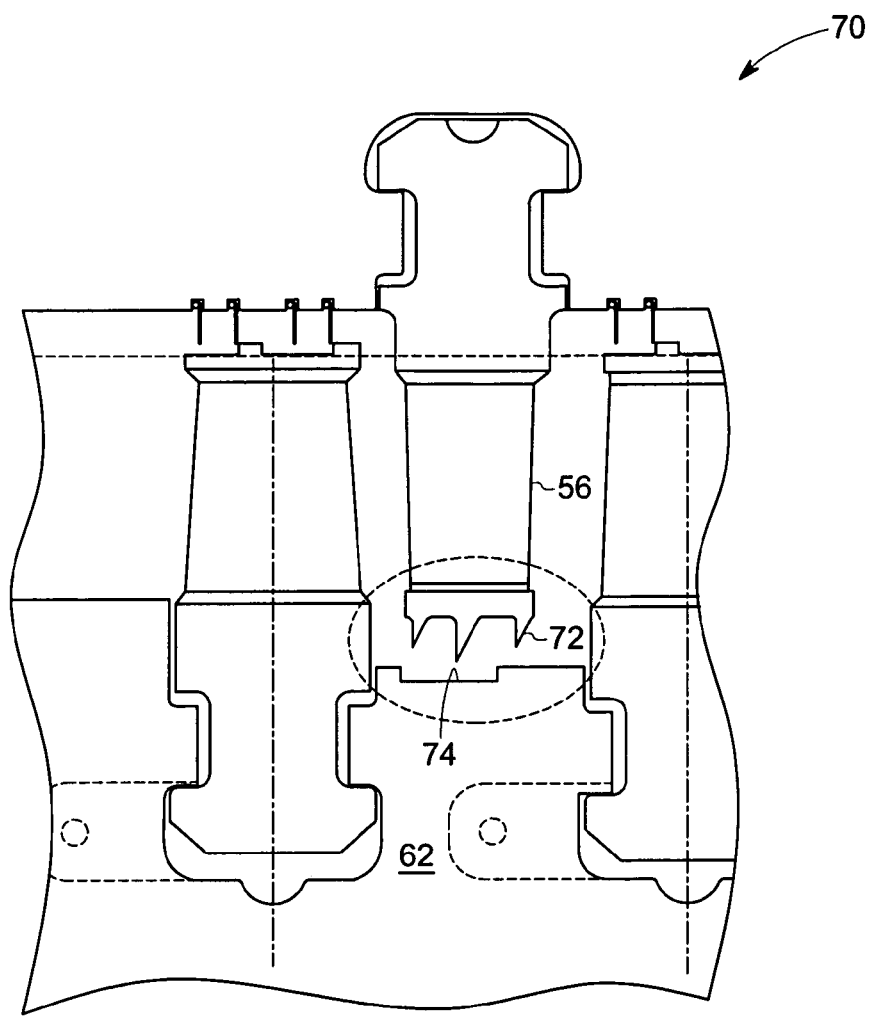
FIG. 5 is a cross-sectional view of a portion of the steam turbine of FIG. 4 wherein the present clearance control technique can be used in accordance with embodiments of the present technique.

Referring now to FIG. 5, a cross-sectional view is shown for a bottom or lower portion 70 of the steam turbine 10 of FIG. 4, illustrating exemplary radial and axial clearance that may be measured by the present technique. In the illustrated embodiment, the tip of the blade 56 includes packing teeth or seal teeth 72 that mesh into a groove 74 provided on the inner circumference of the shroud 62. In a present embodiment, the clearance measurement system 12 (see FIG. 1) may be coupled to the shroud 62 for measuring the radial and axial clearances between the tip of the blade 56 and the shroud 62.

Figure 6:
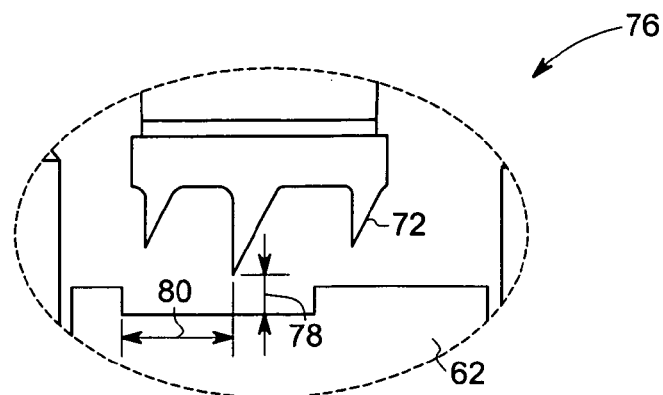
FIG. 6 is a detailed cross-section view of FIG. 5 in accordance with embodiments of the present technique.

FIG. 6 is a detailed cross-section view of a portion 76 of the shroud and blade of the steam turbine of FIG. 5. As illustrated, the radial clearance between the seal teeth 72 and the shroud 62 is represented by reference numeral 78 and the axial clearance between the teeth 72 and the shroud 62 is represented by reference numeral 80. In a present embodiment, the radial and axial clearances 78 and 80 represent the clearances between the center tooth and the shroud. As will be appreciated by one skilled in the art, clearances between the other seal teeth and the shroud 62 may be similarly estimated through the present technique.

In certain embodiments, due to differences in the rate of thermal expansion of the shroud 62 and the rotor 56, there is a potential that the radial clearance 78 may be reduced to zero, leading to interference between the seal teeth 72 and the groove 74. Further, due to this differential rate of expansion, the rotor 56 may grow axially with respect to the shroud 62, leading to axial rubbing of the teeth 72 within the groove 74, thus increasing the rate of wear on the components. These undesirable interferences also can lead to damage of the components. The present technique provides an on-line measurement of radial and axial clearances 78 and 80, which may be incorporated into a closed-loop control strategy to maintain these clearances at values within acceptable limits. The control strategy may include, for example, thermal actuation of the shroud 62, causing it to appropriately expand when the clearance between the shroud 62 and the seal teeth 72 decreases. In this embodiment, thermal actuators utilize the property of thermal expansion to produce movement of the shroud 62. In certain other embodiments, mechanical actuators may be used to compensate for axial growth of the blade 56 within the shroud 62.

As will be appreciated by those of ordinary skill in the art, the capacitance between two objects is a function of the overlap surface area and the separation between the two objects. In the present embodiment, the capacitance between the rotor 56 and the shroud 62 is a function of the radial clearance 78 and the overlap area, which in turn is directly proportional to the axial clearance of the seal teeth 72 with respect to the shroud 62. As the rotor 56 expands radially, the radial clearance between the seal teeth 72 and the shroud 62 changes. Similarly, as the seal teeth 72 move axially across the groove 74, the area of the sensor head covered by the seal teeth 72 will change. These changes will result in a change in measured capacitance. In accordance with aspects of the present technique discussed below, the change in capacitance can be correlated to axial and radial displacements and hence a composite clearance measurement may be obtained. The measurement of radial and axial clearances 78 and 80 via the clearance measurement system 12 will be further described below with reference to FIGS. 7-13.

Figure 7:
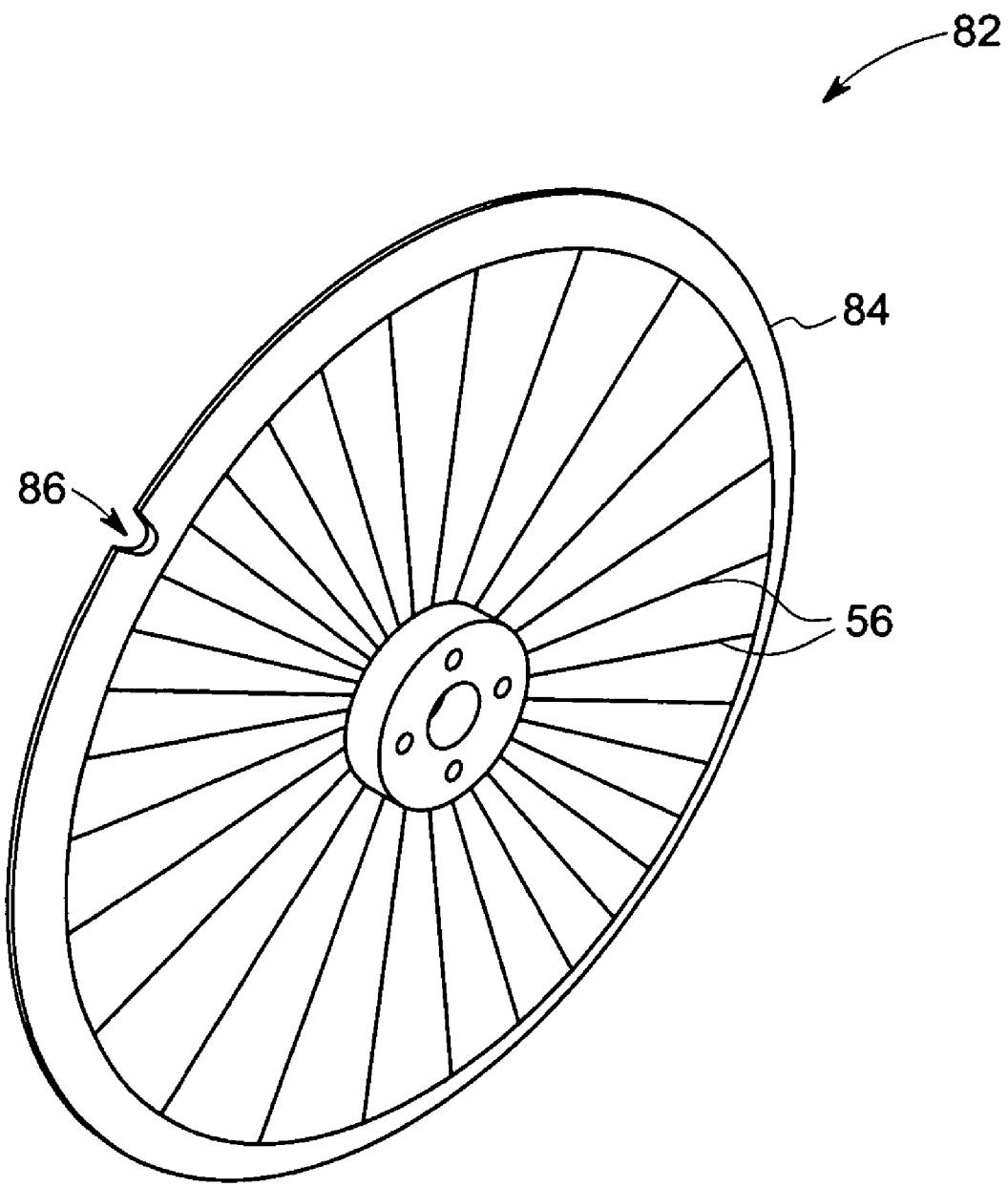
FIG. 7 illustrates a rotating component with a notch for the steam turbine of FIGS. 4 and 5 in accordance with embodiments of the present technique.

FIG. 7 illustrates a rotating component 82 with a notch for the steam turbine of FIGS. 4-5. In the illustrated embodiment, the rotating component 82 includes a plurality of blades or buckets 56 forming a continuously circular structure 84 about the axis of rotation. Further, the rotating component 82 also includes a reference geometry 86 interrupting the continuity of the continuous circular structure 84. Examples of such reference geometry 86 include recesses, such as indents, notches, grooves, slots, and so forth.

In operation, the sensor 64 (see FIG. 4) disposed on the stationary component 62 generates a first signal representative of a first sensed parameter from the rotating component 82 (e.g., the continuously circular geometry). In addition, the sensor 64 generates a second signal representative of a second sensed parameter from the reference geometry 86. In this embodiment, the sensor 64 includes a capacitive probe and the first and second sensed parameters include a capacitance. Further, the first and second signals from the sensor 64 are processed based upon a measurement difference between the first and second sensed parameters to estimate the radial and axial clearance between the stationary and rotating components 62 and 82. In certain embodiments, the sensor 64 may include at least two probe tips for measuring the axial and radial clearances between the stationary and rotating components 62 and 82.

Figure 8:
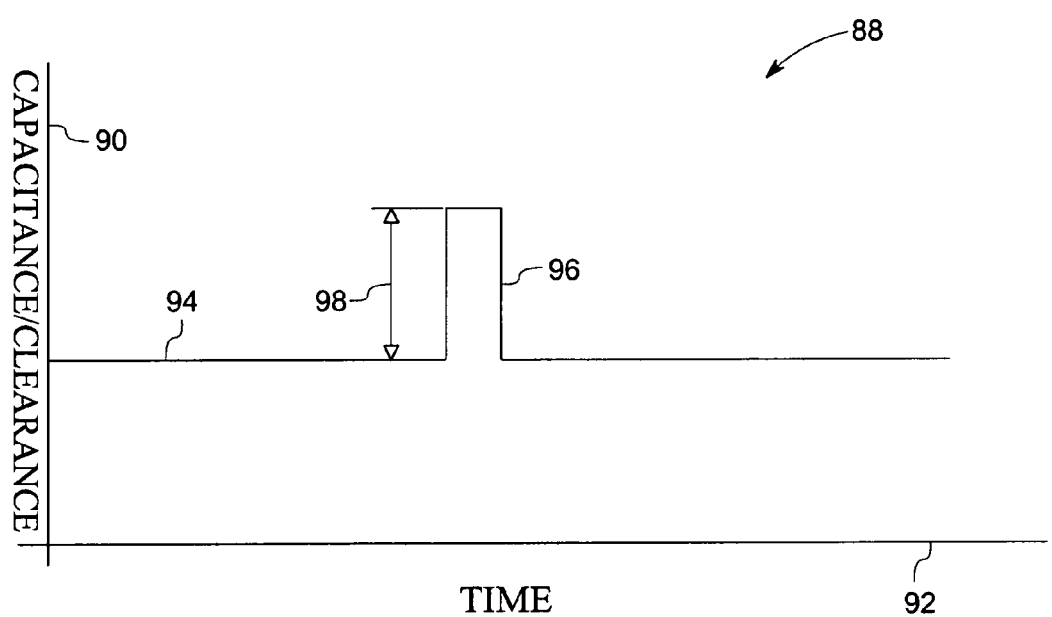
FIG. 8 is a graphical representation of capacitance measured by the clearance measurement system of FIG. 4 from the rotor of FIG. 7 in accordance with embodiments of the present technique.

In the illustrated embodiment, the direct current based capacitive measurements between the stationary and rotating components 62 and 82 are converted to time-varying capacitive measurements based on the reference geometry 86 having a pre-determined depth. In certain embodiments, the reference geometry 86 may include a material other than the material of the rotating component 82. For example, the reference geometry 86 may include a notch on the rotating component 82 that is filled with a dielectric material. FIG. 8 is a graphical representation of capacitance 88 measured by the clearance measurement system of FIG. 4 from the rotor of FIG. 7. The ordinate axis 90 of the capacitive measurements 88 represents the capacitance value sensed by the sensor 64 from the rotating component 82 and the abscissa axis 92 represents the time period. In a present embodiment, the first signal generated by the sensor 64 is representative of a first capacitance sensed from the rotating component 82 and is represented by reference numeral 94. The first capacitance is representative of the clearance between the sensor 64 and the rotating component 82 (e.g., the continuously circular geometry). Further, the sensor 64 also generates a second signal representative of the second capacitance sensed from the reference geometry 86 (e.g., recess or break in the continuously circular geometry) that is represented by the reference numeral 96. In this embodiment, the second capacitance corresponds to the depth 98 of the reference geometry 86. The difference in the first and second capacitances sensed by the sensor 64 and the pre-determined depth 98 of the reference geometry 86 are utilized to determine the clearance between the stationary and rotating components 62 and 82.

As will be appreciated by those skilled in the art, as the clearance increases the difference between the measurements from the rotating component 82 and the reference geometry 86 will decrease. Similarly, as the clearance decreases such difference between the two measurements will increase. Typically, the sensed capacitances are inversely proportional to the clearance between the stationary and rotating components 62 and 82. Therefore, if in an exemplary embodiment, if the clearance between the stationary and rotating components 62 and 82 doubles, the difference between the sensed capacitances between the stationary and rotating components 62 and 82 will be reduced by a factor of 0.5. The following example illustrates the effect of the change in the clearance between the stationary and rotating components 62 and 82 on the measured differences between the sensed capacitances.

EXAMPLE 1

In an exemplary rotating machinery, the sensor output from the sensor 64 corresponding to the rotating component 82 at a distance "a" from the sensor 64 is represented by "x". Further, the sensor output corresponding to the bottom of the reference geometry 86 (having a depth "b") at a distance "a+b" is represented by "y". Assuming that the clearance between the stationary and rotating components 62 and 82 changes to "2a" then the measurement from the sensor 64 corresponding to such clearance will be "x/2". In this embodiment, the bottom of the reference geometry 86 will be at a distance "2a+b" from the sensor 64. Therefore, the difference in signal corresponding to the rotating component 82 and the reference geometry 86 in the first case (at a distance a) will be "x−y". Similarly, the difference in the signal for the second case (at a distance 2a) will be "x/2−y". Therefore, the difference between the two measurements is approximately x/2 that corresponds to the clearance change from "a" to "2a".

Thus, in the illustrated embodiment, the clearance is determined by utilizing the measurement difference between sensed capacitance values in the vicinity of the reference geometry 86 and ones far away from the reference geometry 86.

Figure 9:
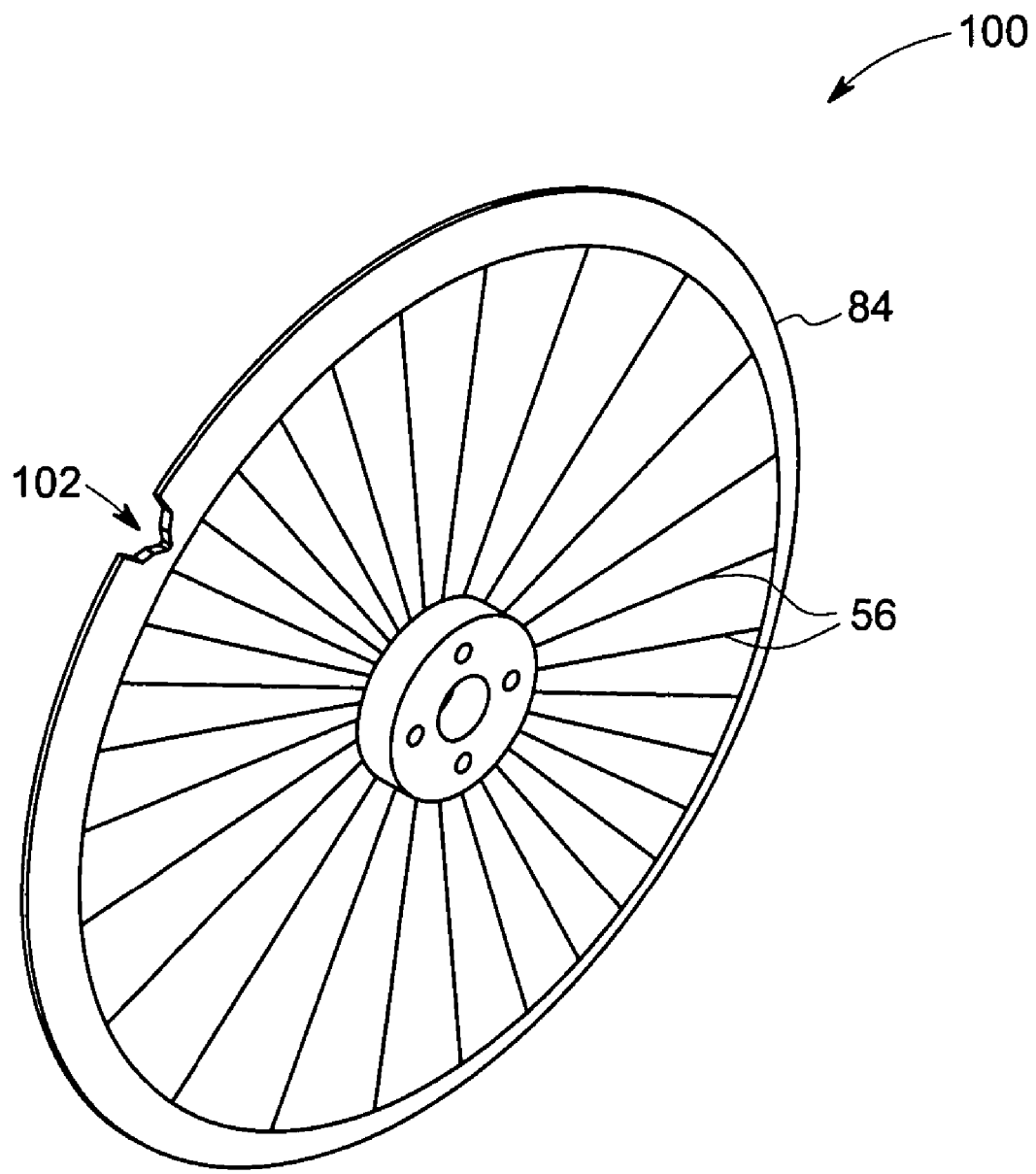
FIG. 9 illustrates a rotating component with a multi-level notch for the steam turbine of FIGS. 4 and 5 in accordance with embodiments of the present technique.

FIG. 9 illustrates another exemplary embodiment of the rotating component 100 of the steam turbine of FIGS. 4 and 5. In the illustrated embodiment, the rotating component 100 includes a multi-level reference geometry, such as a stepped notch 102, disposed along and interrupting the continuity of the continuous circular structure 84. In operation, the sensor 64 generates signals representative of sensed capacitance corresponding to the rotating component 100 (e.g., the continuously circular geometry) and different levels of the multi-level reference geometry 102. Subsequently, such measurements may be utilized to estimate the clearance between the stationary and rotating components 72 and 100 based upon the measurement difference between the sensed capacitances.

Figure 10:
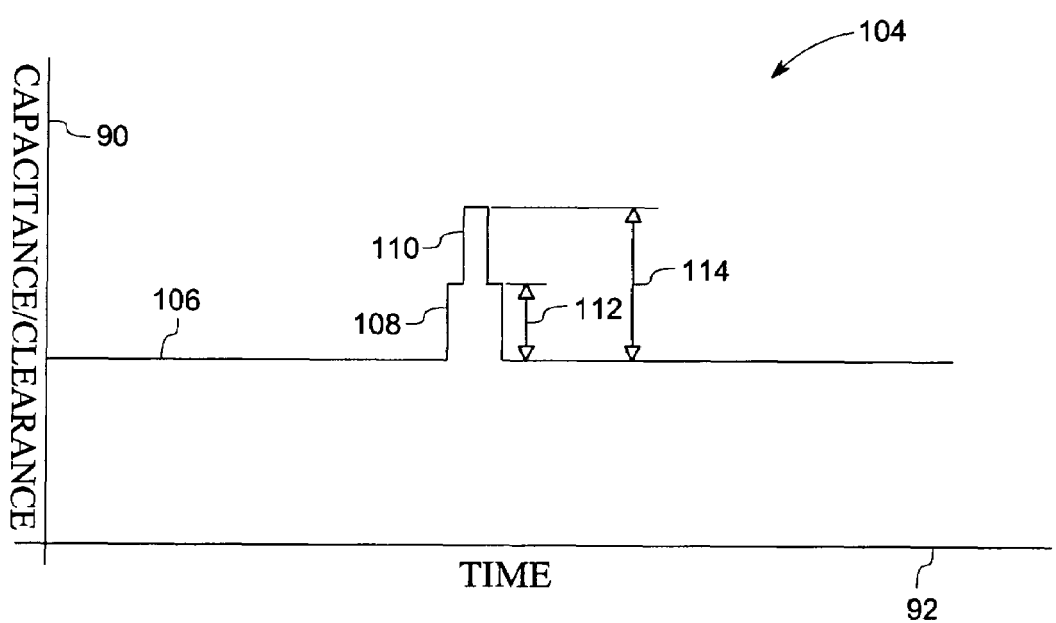
FIG. 10 is a graphical representation of capacitance measured by the clearance measurement system of FIG. 3 from the rotor of FIG. 9 in accordance with embodiments of the present technique.

FIG. 10 is a graphical representation of capacitance 104 measured by the clearance measurement system of FIG. 3 from the rotor of FIG. 9 in accordance with embodiments of the present technique. In the illustrated embodiment, the sensor 64 generates a signal representative of capacitance corresponding to the continuously circular surface of rotating component 100 (away from the multi-level structure 102) as represented by reference numeral 106. Additionally, the sensor 64 generates signals representative of capacitances corresponding to levels of the multi-level structure 102 as represented by reference numerals 108 and 110. Again, the sensed capacitance values correspond to pre-determined depths 112 and 114 of the reference geometry 102. The difference in the sensed capacitances corresponding to the levels of the multi-level structure 102 and the surface of the rotating component 100 is utilized to determine the clearance between the stationary and rotating components 62 and 100. In the illustrated embodiment, multiple differences in the sensed capacitances between the surface of the rotating component 100 and the different levels of the multi-level structure 102 are obtained for every rotation of the rotating component 100. Further, such measurements are processed and appropriate lookup tables may be utilized to determine the clearance between the stationary and rotating components 62 and 100 based upon the measurement differences and the pre-determined depths 112 and 114 of the reference geometry 102. Advantageously, such multiple difference measurements obtained for every rotation of the rotating component substantially increases the speed of the clearance measurement system.

Further, by utilizing multiple measurements (e.g. corresponding to different levels of the stepped notch 102) any noise components in the measurement due to factors such as drifts in the electronics, changes in the material properties of the stationary and rotating components 62 and 100 and so forth may manifest equally among all the measurements and will be subsequently nullified while estimating the difference in the measurements. Thus, employing a reference geometry such as multi-level structure 102 enables a substantially robust and drift insensitive measurement through the clearance measurement system.

Figure 11:
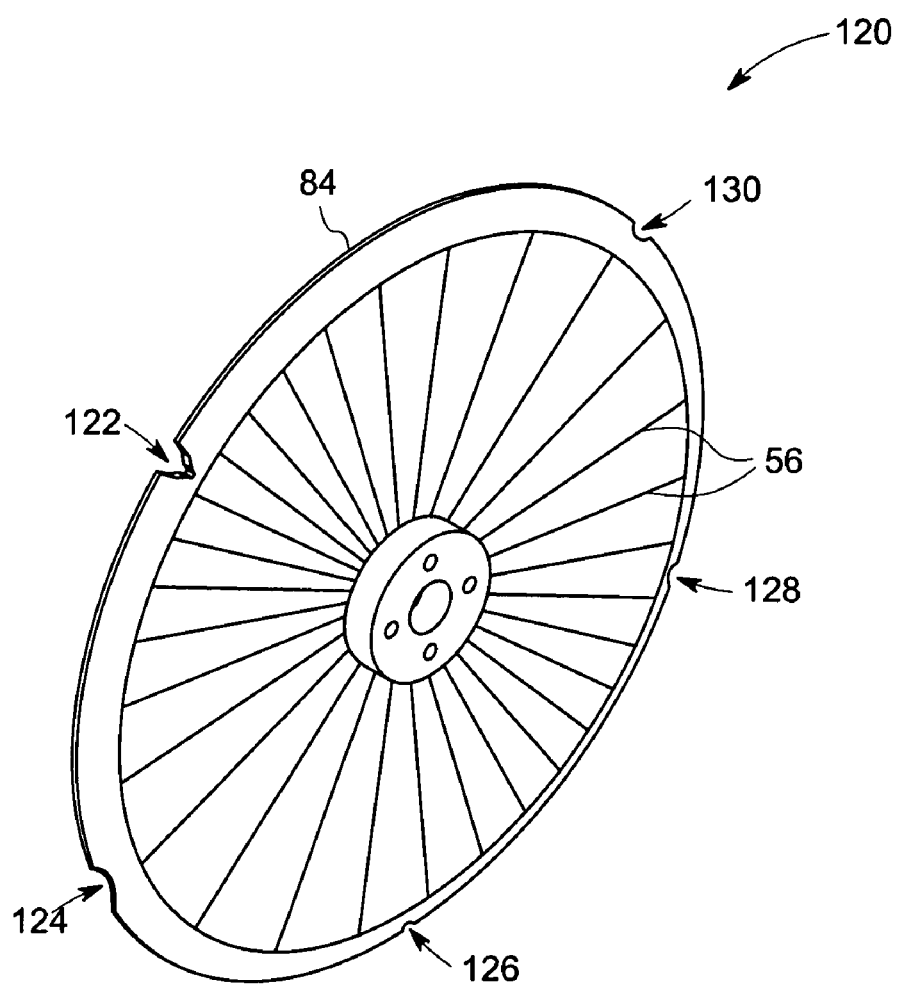
FIG. 11 illustrates a rotating component with multiple notches for the steam turbine of FIGS. 4 and 5 in accordance with embodiments of the present technique.

FIG. 11 illustrates another exemplary configuration 120 of the rotating component having multiple notches disposed on, and interrupting the continuity of, the continuous surface geometry 84 for the steam turbine of FIG. 1. In a presently contemplated configuration, the rotating component 120 includes a plurality of reference geometries or notches, such as represented by reference numerals 122, 124, 126, 128 and 130. For example, the rotating component 120 may include a multi-level notch 122 along with semi circular notches 124, 126, 128 and 130 having different depths for interrupting the continuity of the continuous circular structure 84. In the illustrated embodiment, the sensor 64 generates signals representative of capacitances corresponding to each of these notches 122, 124, 126, 128 and 130. Advantageously, the speed of the measurement system increases by employing the plurality of notches 122, 124, 126, 128 and 130 as multiple differences between the sensed parameters are obtained for every rotation of the rotating component 120. In certain embodiments, such multiple differences may be employed as a means for self-calibrating the clearance measurement system.

Further, such sensed parameters (i.e. capacitances) are subsequently processed to determine the clearance between the stationary and rotating components 62 and 120 based upon the measurement differences and the pre-determined depths of the plurality of notches 122, 124, 126, 128 and 130. In the illustrated embodiment, multiple measurements based upon the plurality of notches 122, 124, 126, 128 and 130 having pre-determined geometry substantially reduces the effect of any noise components in the measurement. For example, noise in the measurement due to factors such as drifts in the electronics, changes in the material properties of the stationary and rotating components 62 and 120 and so forth may be substantially reduced by employing the plurality of notches 122, 124, 126, 128 and 130. Specifically, the noise components may manifest equally among all the measurements and are subsequently nullified while estimating the difference in the measurements. Thus, employing a plurality of notches on the rotating component 120 enables a substantially robust and drift insensitive measurement through the clearance measurement system.

Typically, the size of each of the plurality of notches 122, 124, 126, 128 and 130 is of the same order as the probe tip size to facilitate receiving signals from the bottom of the notches 122, 124, 126, 128 and 130 without interference from the side walls of the respective notches. In addition, the size of each of these notches 122, 124, 126, 128 and 130 is selected such that these notches do not affect the dynamics or performance of the rotating machinery such as the steam turbine. In general, the probe tip size is typically of the same order as the clearance that is being measured. For example, for a steam turbine application, the probe tip may be about 200 mils in diameter, and the size of the notch may be about 125-mil radius half circle. That is, the notch may be about 250-mil wide and about 125 mil deep half circle. In certain embodiments, where multiple notches are employed, or where a multi-level notch is employed, the size of the notch step may be selected so that the signals corresponding to the different levels may be resolved accurately. For example, if the usable range of the sensor is about 150 mils, and the expected range of clearances is about 100 mils, then the size of the steps in the notch may be selected to be within 50 mils of each other, so that over substantial operating range of the sensor, the various levels of the notch will be discernible.

As illustrated above, the sensor 64 may be employed to sense capacitances corresponding to the rotating component 120 and a plurality of reference geometries such as 122, 124, 126, 128 and 130. In the illustrated embodiment, the sensor 64 is a capacitance probe. In certain embodiments, the capacitive probe 64 includes at least two probe tips for measuring an axial and a radial clearance between the stationary and rotating component of a rotating machinery. As discussed earlier, capacitance between the rotating component 120 and the sensor 64 is a function of two variables, namely the radial clearance and the axial clearance. Hence by measuring the capacitance of the two probes, it is possible to obtain the actual values for the variables radial clearance and axial clearance.

Figure 12:
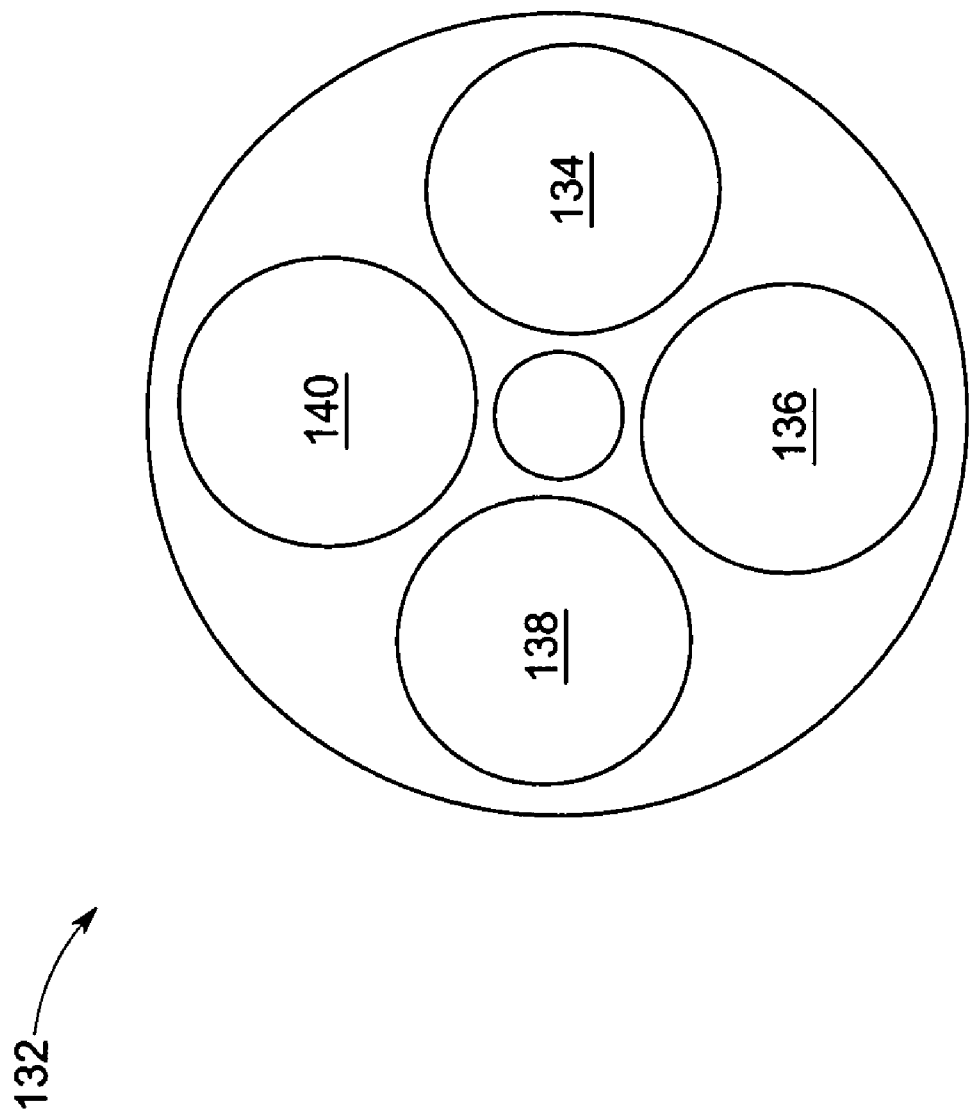
FIG. 12 illustrates an exemplary configuration of sensors employed for the clearance measurement system of FIG. 1 in accordance with embodiments of the present technique.

FIG. 12 illustrates a plan view of an exemplary configuration 132 of the sensor 64 employed for measuring the clearance between stationary and rotating components in the steam turbine of FIGS. 1 and 4. In the illustrated embodiment, the sensor 132 includes a plurality of capacitive probe tips 134, 136, 138 and 140, which may include, for example, electrically conductive shafts. The illustrated geometry and relative locations of the probes 134, 136, 138 and 140 facilitate measurement of a large axial displacement range, for example, in excess of 0.5 inches, while providing a desirable resolution for radial measurements, for example, for measuring displacements on the order of 0.01 inches. The above feature is advantageous in applications where the axial displacements of the rotating component 14 are substantially larger than the radial displacements with respect to the shroud 16.

In the illustrated embodiment, the probes 134, 136, 138 and 140 are positioned in a staggered manner, having a diamond shaped configuration, on the sensor head to maximize sensitivity to change in overlap area. Other staggered configurations may be conceived in embodiments having greater or lesser number of probes. The diameters of the probes 134, 136, 138 and 140 at the head or tip portion are suitably large enough to provide adequate overlap surface area between them and the tip of the blade 14. In the illustrated embodiment, i.e. for a steam turbine application, the probes 134, 136, 138 and 140 may be formed from a material comprising nickel, aluminum, cobalt, or combinations thereof, such as Kovar. However, in applications involving higher temperatures (e.g., temperatures in excess of 1000 degrees centigrade), a material comprising platinum, rhodium, or combinations thereof may be used for the probes 134, 136, 138, and 140.

Figure 13:
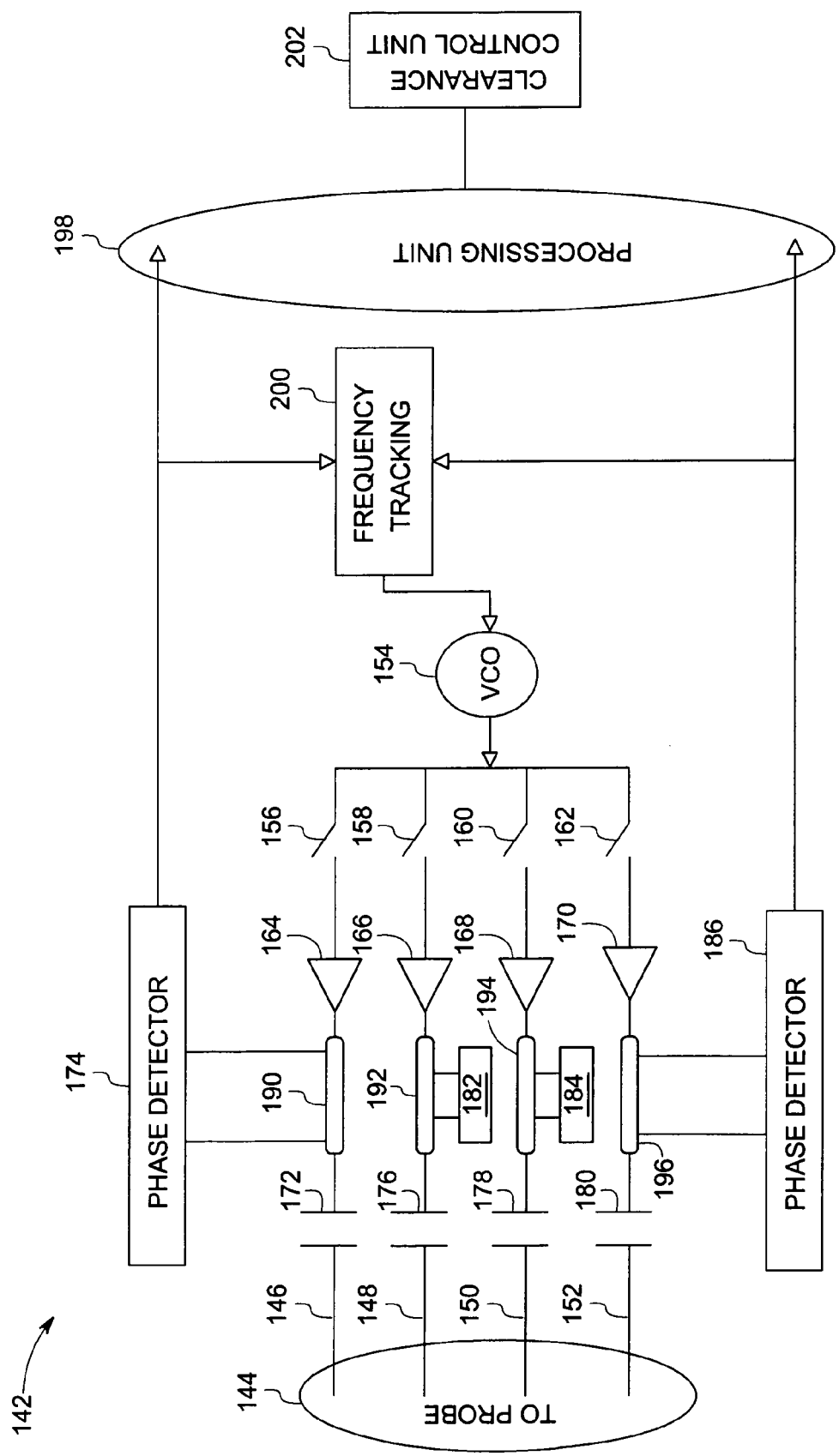
FIG. 13 is a diagrammatical illustration of the clearance measurement system of FIGS. 1 and 4 in accordance with an embodiment of the present technique.

FIG. 13 illustrates an exemplary configuration 142 of the clearance measurement system of FIGS. 1-4 in accordance with an embodiment of the present technique. The clearance measurement system 142 includes a sensor 144 having four probe tips 146, 148, 150 and 152 arranged in a diamond shaped configuration as illustrated above with reference to FIG. 12. Further, a signal generator 154 is coupled to the probe tips 146, 148, 150 and 152 to provide input excitation signals to the sensors 146, 148, 150 and 152. In the illustrated embodiment, the signal generator 154 includes a voltage-controlled oscillator (VCO). The excitation signals from the signal generator 154 may be switched between the probe tips 146, 148, 150 and 152 through switches 156, 158, 160 and 162. In certain embodiments, the probe tips 146, 148, 150 and 152 are simultaneously excited via the signal generator 154. Alternatively, the probe tips 146, 148, 150 and 152 may be excited at different points in time to reduce the cross talk between the probe tips 146, 148, 150 and 152.

Moreover, amplifiers 164, 166, 168 and 170 may be coupled to the signal generator 154 to amplify input signals received by the probe tips 146, 148, 150 and 152, respectively. In the illustrated embodiment, a capacitor 172 and a phase detector 174 are coupled to the probe tip 146 for measuring the capacitance through the probe tip 146. Similarly, capacitors 176, 178, 180 and phase detectors 182, 184 and 186 may be coupled to the probe tips 148, 150 and 152, respectively, for measuring the capacitance through each of these probe tips. Further, directional couplers 190, 192, 194 and 196 may be coupled to the probe tips 146, 148, 150 and 152 for separating incident and reflected signals from the respective probe tips.

In operation, the probe tips 146, 148, 150 and 152 are excited by the signal generator 154 at an excitation frequency. The excitation frequency may be selected based upon a wire length, capacitance, geometry of probe tips 146, 148, 150 and 152, a static measurement capacitance, and other factors. In a present embodiment, the phase detectors 174, 182, 184 and 186 are configured to detect reflected signals from the probe tips 146, 148, 150 and 152 based upon the excitation frequency to generate a first signal representative of a first sensed parameter, i.e., capacitance, from the first object such as the surface of the rotating component 14. The capacitance through the probe tips 146, 148, 150 and 152 is measured by measuring a phase difference between the excitation signals and the corresponding reflected signals by the capacitors 172, 176, 178, 180 and the phase detectors 174, 182, 184 and 186. Similarly, the second signal representative of the second sensed parameter, i.e., capacitance, is generated from the reference geometry disposed on the rotating component 14 by measuring the phase difference between the excitation signal and the corresponding reflected signal from the reference geometry. In certain embodiments, multiple signals may be generated corresponding to multi levels of the reference geometry disposed on the rotating component 14 such as illustrated above with reference to FIGS. 9 and 10. In certain other embodiments, multiple signals may be generated from the sensor 144 corresponding to a plurality of reference geometries disposed on the surface of the rotating component 14 such as discussed above with reference to FIG. 11.

The first and second signals generated from the sensor 144 may be then processed via a processing unit 198. Further, the frequency of the excitation signals from the signal generator may be tracked and controlled via a frequency tracking unit 200. In operation, the processing unit 198 receives signals representative of sensed capacitances corresponding to the rotating component 14 and the reference geometries disposed on the rotating component 14. Further, the processing unit 198 estimates the clearance between the rotating and stationary components 14 and 16 based upon the measurement difference between the sensed capacitances from the rotating component 14 and the reference geometries. More specifically, such sensed capacitances are processed to determine the clearance between the stationary and rotating components 14 and 16 based upon the measurement differences and the pre-determined sizes of the reference geometries.

The measurements based upon the referenced geometries having pre-determined size substantially reduces the effect of any noise components in the measurement by factors such as drifts in the electronics, changes in the material properties of the stationary and rotating components 14 and 16 and so forth. In the illustrated embodiment, the noise components may manifest equally among all the measurements and are subsequently nullified while estimating the difference in the measurements. Thus, in this embodiment the time varying signals received by the processing unit 198 are processed and features of the signal are extracted. In this embodiment, the features of the signal include the baseline level and the notch height. Further, the extracted notch height is compared against the pre-determined size of the notch. As the measured notch height will be scaled depending on the clearance, the clearance can be determined using one of several methods. The methods include a lookup table, an analytical/physics based model, or a curve fit function. As described above, a plurality of such reference geometries may be employed and through the pre-determined size of such reference geometries the processing unit 198 determines the clearance necessary to provide the measured scaling of said reference geometry. Therefore, any measurement error that for example introduces a fixed offset over a relatively long time (non-time varying, or slowly varying error) will be eliminated since the processing is done using the difference in measurements and not the absolute value of the measurements. Similarly, any gain error can also be eliminated when a multi-level geometry is used since the processing is done on multiple differences of the feature depths. In general, offset (slow varying) errors can be eliminated by employing a simple notch and gain/scaling errors can be eliminated by using a multi-level geometry.

Thus, by interrupting the continuity of the continuous surface geometry of the rotating component 14 by the reference geometry, the clearance measurement system 142 converts direct current based capacitive measurements between the rotating and stationary components 14 and 16 to time-varying capacitive measurements. More particularly, interruption of the continuity of the continuous surface geometry through a reference geometry introduces a spike in the signal produced by the capacitive probes that can be used for self calibrating the sensing system and ensure that measurements are not affected by signal drifts.

As discussed earlier, such time varying capacitive measurements are utilized to estimate the clearance between the rotating and stationary components 14 and 16. In certain embodiments, the processing unit 198 may employ a look-up table, or a calibration curve, or other techniques for estimating the clearance based upon the measurement difference between the sensed capacitances and pre-determined sizes of the reference geometries disposed on the rotating component 14. Further, a clearance control unit 202 may be coupled to the processing unit 198 for controlling the clearance between the rotating and stationary components based upon the clearance estimated by the processing unit 198.

Figure 14:
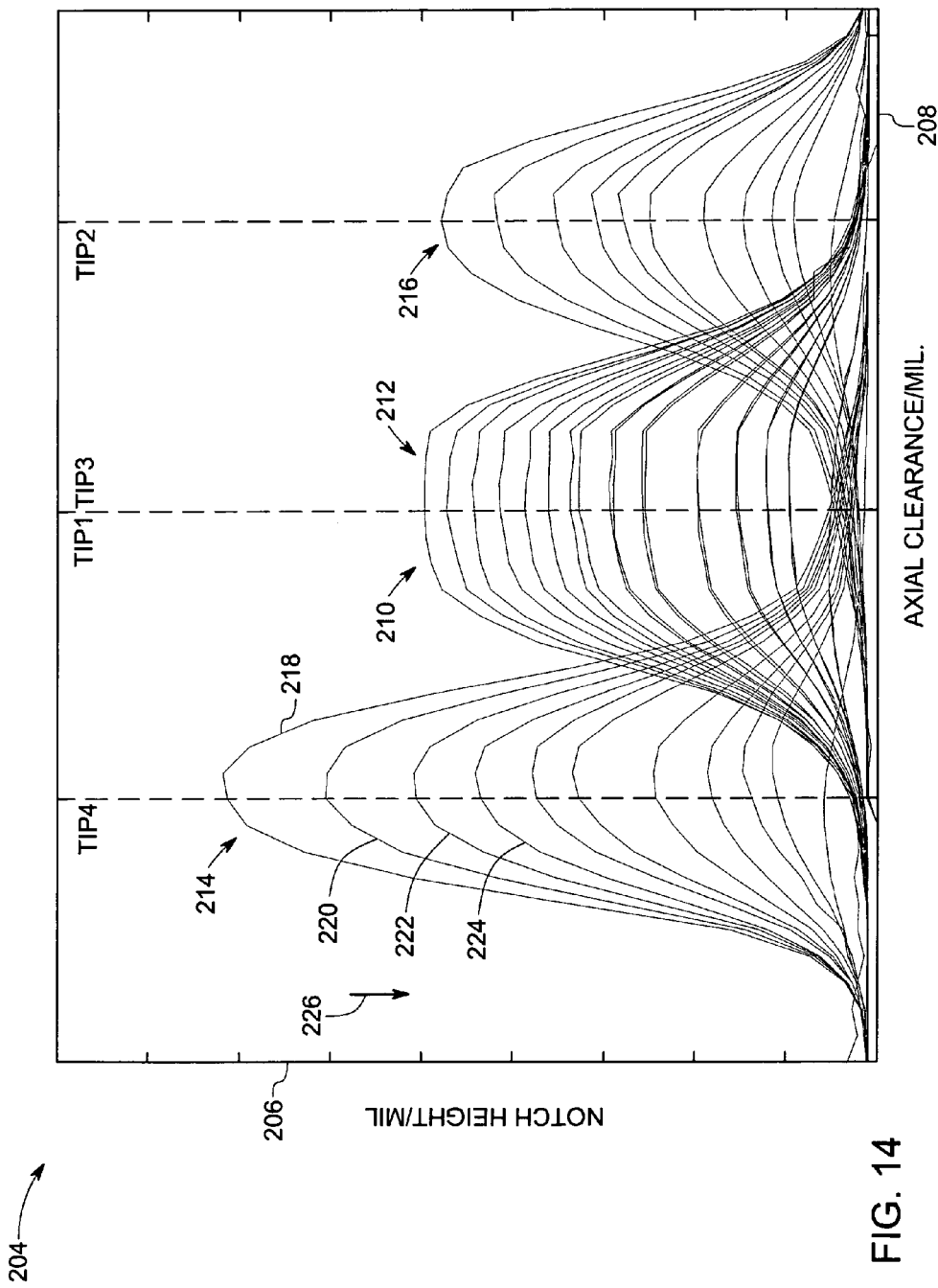
FIG. 14 is a graphical representation of clearance measured by the clearance measurement system of FIG. 13 in accordance with embodiments of the present technique.

FIG. 14 is a graphical representation of sensor output 204 measured by the clearance measurement system of FIG. 13 in accordance with embodiments of the present technique. The ordinate axis of the output 204 represents measured notch height 206 from the probe tips and the abscissa axis represents the axial clearance 208 measured in mils between the rotating and stationary components 14 and 16. In the illustrated embodiment, graphs 210 and 212 represent the notch height measured from two probe tips 136 and 140 that are located at same radial position as illustrated in FIG. 12. Further, curves 214 and 216 represent the notch height measured from probe tips 138 and 134 that are located on left and right side of the probe tips 136 and 140. In a present embodiment, the measured notch height 206 is a measure of the clearance between the stationary and rotating objects.

As illustrated, the electrical signature of the reference geometry such as a notch that is represented by the notch height 206 varies according to the notch height, which, in turn, is a function of the axial and radial displacement. For example, when the probe tip 136 is substantially close to the notch the signal received from the probe tip is represented by curve 218. Further, as the probe tip 136 moves away from the notch the signals are represented by curves 220 and 224. Thus, the signal received from the notch changes according to the notch height and the distance of the notch from the probe tips 134, 136, 138 and 140. As the radial clearance between the rotating and stationary components increases the sensed output from the probe tips 134, 136, 138 and 138 is reduced. For example, an increase in the radial displacement represented by reference numeral 226 is reflected in the signals 218, 220, 222 and 224 from the probe tip 136. Similarly, the signals from other probe tips 134, 138 and 140 changes in response to the notch height and the distance from the probe tips as represented by curves 210, 212 and 216.

The various aspects of the method described hereinabove have utility in different applications. For example, the technique illustrated above may be used for measuring the clearance between rotating and static components in a steam turbine. The technique may also be used in certain other applications, for example, for measuring clearance between stationary and rotating components in generators. As noted above, even more generally, the method described herein may be advantageous for providing accurate measurement of clearance between objects through sensors by converting direct current based capacitive measurements between the stationary and rotating components to time-varying capacitive measurements based on at least one reference geometry interrupting the continuous surface geometry of the rotating component. Further, the technique is particularly advantageous to provide a self-calibrating sensor system for accurate clearance measurement of parts, even in operation and over extended periods of time, enabling better clearance control in parts while in operation.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A clearance measurement system, comprising:
a reference geometry disposed on a first object having an otherwise continuous surface geometry, wherein the otherwise continuous surface geometry comprises a circular structure extending along a plurality of blades that are independent from the reference geometry, wherein the reference geometry comprises a multi-level structure having a plurality of different levels relative to the otherwise continuous surface geometry, a plurality of reference geometries each having a different level relative to the otherwise continuous surface geometry, or a combination thereof;
a sensor disposed on a second object, wherein the sensor is configured to generate a first signal representative of a first sensed parameter from the first object and a second signal representative of a second sensed parameter from the reference geometry; and
a processing unit configured to process the first and second signals to estimate a clearance between the first and second objects based upon a measurement difference between the first and second sensed parameters, wherein the second signal representative of the second sensed parameter corresponding to reference geometry changes as a function of the clearance between the first and second objects, wherein the sensor system is configured to measure the clearance as the first object moves relative to the second object.

2. The system of claim 1, wherein the first object comprises a rotating member and the second object comprises a stationary member disposed about the rotating member in a turbine.

3. The system of claim 1, further comprising:
an excitation source configured to supply excitation signals to the sensor;
a phase detector configured to detect a plurality of reflected signals from respective ones of the first object and the reference geometry and to perform a plurality of phase measurements to determine a phase between each of the reflected signals and the respective excitation signals.

4. The system of claim 1, wherein the sensor is a capacitive probe, and the first and second sensed parameters are capacitances.

5. The system of claim 4, wherein the capacitive probe comprises at least two probe tips for measuring an axial and a radial clearance.

6. The system of claim 1, wherein the reference geometry comprises the plurality of reference geometries.

7. The system of claim 6, wherein each of the plurality of reference geometries comprises a different depth recessed below the otherwise continuous surface geometry.

8. The system of claim 1, wherein the reference geometry comprises the multi-level structure.

9. The system of claim 1, wherein the processing unit comprises a look-up table, or a calibration curve, or an analytical model, or a calculation, or combinations thereof for estimating the clearance between the first and second objects based upon the measurement difference between the first and second sensed parameters.

10. The system of claim 1, further comprising a clearance control unit coupled to the processing unit for controlling the clearance between the first and second objects based upon the clearance estimated by the processing unit.

11. A rotating machine, comprising:
a rotating component spaced apart from a stationary component, wherein the rotating component comprises a continuous surface in the direction of rotation of the rotating component;
a multi-level reference geometry disposed on the continuous surface of the rotating component, wherein the multi-level reference geometry comprises at least a first level and a second level different from the first level, and the first level and the second level are different from the continuous surface;
a sensor configured to generate first and second signals representative of first and second sensed parameters corresponding to the rotating component and different levels of the multi-level reference geometry, respectively, wherein the second signal representative of the second sensed parameter corresponding to the reference geometry changes as a function of the clearance between the rotating component and the stationary component; and
a processing unit configured to process the first and second signals to estimate a clearance between the rotating and stationary components based upon a measurement difference between the first and second sensed parameters and pre-determined depths of the different levels of the multi-level reference geometry.

12. The rotating machine of claim 11, wherein the sensor is disposed within the stationary component of the rotating machine.

13. The rotating machine of claim 11, wherein the rotating machine comprises a steam turbine, or a generator, or an electric motor, or a pump, or a compressor.

14. The rotating machine of claim 13, wherein the rotating component comprises a rotating bucket and the stationary component comprises a carrier disposed about the rotating bucket, and the rotating bucket comprises the continuous surface extending concentric with a plurality of blades.

15. The rotating machine of claim 11, wherein the sensor comprises a capacitive probe and the first and second sensed parameters comprise capacitance.

16. The rotating machine of claim 11, further comprising a plurality of reference geometries having dissimilar geometries from one another disposed on the continuous surface of the rotating component.

17. A method of measuring a clearance between a first object and a second object, comprising:
generating a first signal indicative of a first sensed parameter corresponding to the first object via a sensor disposed on the second object, wherein the sensor comprises at least two probe tips for measuring axial and radial clearances between the first and second objects, the first and second objects rotate relative to one another, and the first and second objects are generally circular at an interface between the first and second objects;
generating a second signal indicative of a second sensed parameter corresponding to a clearance reference disposed on a continuous circular surface of the first object via the sensor disposed on the second object, wherein the second signal indicative of the second sensed parameter corresponding to the clearance reference changes as a function of the clearance between the first object and the second object, and the clearance reference comprises a multi-level reference geometry with different levels relative to the continuous circular surface, a plurality of reference geometries each having a different level relative to the continuous circular surface, or a combination thereof;

processing the first and second signals to estimate the clearance between the first and second objects based upon a measurement difference between the first and second sensed parameters; and controlling the clearance between the first and second objects based upon the estimated clearance between the first and second objects.

18. The method of claim 17, wherein generating the second signal comprises generating a signal corresponding to the clearance reference having a pre-determined depth.

19. The method of claim 17, wherein generating the second signal comprises generating a plurality of signals corresponding to the plurality of reference geometries.

20. The method of claim 17, wherein processing the first and second signals comprises detecting a plurality of reflected signals from respective ones of the first object and the clearance reference and performing a plurality of phase measurements to determine a phase between each of the reflected signals and corresponding excitation signals.

21. The method of claim 17, wherein generating the first and second signals comprises measuring first and second capacitance values as the first and second sensed parameters.

22. The rotating machine of claim 15, wherein the capacitive probe comprises at least two probe tips for measuring an axial and a radial clearance.

23. The method of claim 17, wherein generating the second signal indicative of the second sensed parameter corresponding to the clearance reference comprises generating the second signal that changes in response to the clearance between the first and second objects.

24. The method of claim 17, wherein the clearance reference comprises a recess in the continuous circular surface.

25. The method of claim 17, wherein measuring a clearance comprises measuring the clearance as the first object moves relative to the second object.

26. The method of claim 17, wherein the clearance reference comprises the multi-level reference geometry with different levels relative to the continuous circular surface.

27. A rotating machinery, comprising:
a rotating component spaced apart from a stationary component, wherein the rotating component comprises a continuously circular structure having a plurality of reference geometries interrupting the continuity of the continuously circular structure about an axis of rotation of the rotating component, wherein the plurality of reference geometries each having a different level relative to the continuously circular structure; and
a clearance measurement system coupled to the rotating component and to the stationary component, wherein the clearance measurement system is configured to convert direct current based capacitive measurements between the rotating and stationary components to time-varying capacitive measurements based on at least one of the plurality of reference geometries, wherein the time-varying capacitive measurements change as a function of the clearance between the rotating component and the stationary component, and the clearance measurement system is configured to estimate a clearance between the rotating and stationary components based on the time-varying capacitive measurements.

28. The rotating machinery of claim 27, wherein the plurality of reference geometries comprises a multi-level reference geometry having at least a first level and a second level different from the first level, wherein the first level and the second level are different from the continuously circular structure about the axis of rotation of the rotating component.

29. The system of claim 27, wherein the plurality of blades are concentric with and independent from the circular structure.

30. The system of claim 27, wherein each of the plurality of reference geometries is recessed into the continuously circular structure.

31. A system, comprising:
a rotatable structure having a plurality of blades and a circular structure disposed concentric with the plurality of blades, wherein the circular structure comprises a capacitive clearance reference having a multi-level reference geometry with different levels relative to a surface of the circular structure, a plurality of reference geometries each having a different level relative to the surface, or a combination thereof; and
a stationary structure concentric with the rotatable structure, wherein the capacitive clearance reference is configured to enable conversion of direct current based capacitive measurements between the rotatable and stationary structures to time-varying capacitive measurements.

32. The system of claim 31, comprising the multi-level reference geometry having a recess with different depths extending below the surface of the circular structure.

33. The system of claim 31, comprising the plurality of reference geometries each having a different recess with a different depth extending below the surface of the circular structure.

34. The system of claim 31, wherein a clearance system configured to provide an axial clearance measurement and a radial clearance measurement between the rotable and stationary structures.

35. The system of claim 31, wherein the plurality of blades are concentric with and independent from the circular structure.

* * * * *